United States Patent
Zhou et al.

(10) Patent No.: US 11,050,526 B2
(45) Date of Patent: *Jun. 29, 2021

(54) METHOD AND APPARATUS FOR TRANSMITTING AND OBTAINING UPLINK HARQ FEEDBACK

(71) Applicant: Beijing Xiaomi Mobile Software Co., Ltd., Beijing (CN)

(72) Inventors: Juejia Zhou, Beijing (CN); Ming Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/348,914

(22) PCT Filed: Nov. 11, 2016

(86) PCT No.: PCT/CN2016/105499
§ 371 (c)(1),
(2) Date: May 10, 2019

(87) PCT Pub. No.: WO2018/086072
PCT Pub. Date: May 17, 2018

(65) Prior Publication Data
US 2019/0280828 A1   Sep. 12, 2019

(51) Int. Cl.
*H04L 1/18* (2006.01)
*H04L 12/865* (2013.01)
(Continued)

(52) U.S. Cl.
CPC .......... *H04L 1/1893* (2013.01); *H04L 1/1812* (2013.01); *H04L 5/0064* (2013.01);
(Continued)

(58) Field of Classification Search
CPC ... H04L 1/1864; H04L 1/1854; H04L 1/1893; H04L 47/6275; H04L 5/0064; H04W 72/10
See application file for complete search history.

(56) References Cited

U.S. PATENT DOCUMENTS

2011/0268059 A1   11/2011   Li et al.
2012/0057487 A1*  3/2012   Ahn ..................... H04L 1/1614
                                                                 370/252
(Continued)

FOREIGN PATENT DOCUMENTS

CN   102223217 A   10/2011
CN   102237992 A   11/2011
(Continued)

OTHER PUBLICATIONS

3GPP TS 36.321, Evolved Universal Terrestrial Radio Access (E-UTRA); Medium Access Control (MAC) protocol specification, V13.2.0 (Year: 2016).*
(Continued)

*Primary Examiner* — Un C Cho
*Assistant Examiner* — Peter K Mak
(74) *Attorney, Agent, or Firm* — Finnegan, Henderson, Farabow, Garrett & Dunner, L.L.P.

(57) ABSTRACT

Methods and apparatus for transmitting and obtaining uplink HARQ feedbacks are provided. The method of transmitting uplink HARQ feedbacks includes: obtaining a service priority ordered list associated with a plurality of downlink subframes; generating to-be-sent HARQ feedbacks, by bundling HARQ feedbacks associated with downlink subframes in a descending order of service priorities based on the service priority ordered list; and successively assigning uplink subframes for the to-be-sent HARQ feedbacks to transmit the to-be-sent HARQ feedbacks to a base station. With the method of transmitting uplink HARQ feedbacks (Continued)

provided by the present disclosure, user equipment may preferentially transmit HARQ feedbacks of subframes with low-latency to the base station. When the base station determines that the transmission of the latency-sensitive service data is faulty, the downlink subframe carrying the latency-sensitive service data is preferentially re-transmitted, thereby shortening the delivery time of the latency-sensitive service data.

12 Claims, 8 Drawing Sheets

(51) Int. Cl.
*H04L 5/00* (2006.01)
*H04W 72/10* (2009.01)
*H04L 12/863* (2013.01)

(52) U.S. Cl.
CPC ........ *H04L 47/622* (2013.01); *H04L 47/6275* (2013.01); *H04W 72/10* (2013.01)

(56) References Cited

U.S. PATENT DOCUMENTS

| | | |
|---|---|---|
| 2013/0121270 A1 | 5/2013 | Chen et al. |
| 2013/0235854 A1 | 9/2013 | Li et al. |
| 2014/0269456 A1* | 9/2014 | Wang ................ H04W 72/082 370/280 |
| 2014/0369290 A1* | 12/2014 | Yang .................... H04L 5/0055 370/329 |
| 2015/0264678 A1* | 9/2015 | Yin ...................... H04L 1/1854 370/329 |
| 2016/0242047 A1 | 8/2016 | Li et al. |
| 2018/0013522 A1* | 1/2018 | Liu ...................... H04L 5/0055 |
| 2018/0262302 A1* | 9/2018 | Bergstrom ........... H04L 1/1812 |

FOREIGN PATENT DOCUMENTS

| | | |
|---|---|---|
| CN | 102971979 A | 3/2013 |
| CN | 103036660 A | 4/2013 |
| CN | 103580827 A | 2/2014 |
| CN | 104604160 A | 5/2015 |

OTHER PUBLICATIONS

International Search Report Issued in Application No. PCT/CN2016/105499, from the State Intellectual Property Office of the People's Republic of China, dated Jul. 27, 2017, 4 pages.

English translation of Written Opinion of the International Searching Authority of PCT Application No. PCT/CN2016/105499, dated Jul. 27, 2017, issued by the ISA State Intellectual Property Office of the People's Republic of China, 3 pages.

* cited by examiner

METHOD AND APPARATUS FOR TRANSMITTING AND OBTAINING UPLINK HARQ FEEDBACK

CROSS REFERENCE TO RELATED APPLICATIONS

This application is a national phase application based on PCT/CN2016/105499, filed Nov. 11, 2016, the content of which is incorporated herein by reference.

TECHNICAL FIELD

The present disclosure relates to the field of communication technology and more particular to methods, apparatuses for transmitting and obtaining uplink HARQ feedbacks.

BACKGROUND

With the development of wireless communication technologies, mobile communication networks are gradually evolving to 5G networks. The 5G network may configure more downlink service types based on user requirements. In a Long Term Evolution (LTE) Time Division Duplexing (TDD) system of the 5G network, downlink subframes are configured more than uplink subframes. In a data transmission link, when user equipment sends Hybrid Automatic Repeat reQuest (HARQ) feedbacks to a base station, the HARQ feedbacks associated with a plurality of downlink subframes can be reported simultaneously within one uplink subframe configured for sending HARQ feedbacks. The HARQ feedback includes an ACK signal or a NACK signal.

In the related art, for user equipment in power constrained situations, which may be caused by a long distance away from a base station or a poor channel condition, HARQ feedback bundling may be used. The HARQ feedback bundling may bundle a plurality of HARQ feedbacks associated with the plurality of downlink subframes according to a receiving sequence of the downlink subframes. That is, a logical AND operation is performed for a preset number of ACK or NACK signals, and one-bit ACK or NACK signal is generated. The generated signal is fed back to the base station within an uplink subframe.

However, data with different service types may have different latency requirements. For example, an Ultra Reliable Low Latency Communication (URLLC) service is applied to a field with low latency such as internet of vehicles which requires high timeliness; and a massive Machine Type Communication (mMTC) service is usually insensitive to latency and the data may be delivered in a relatively large time interval. With the method of transmitting uplink HARQ feedbacks in the related art, the timeliness of sending HARQ feedbacks of a subframe with low latency may be affected, thereby affecting delivery of low-latency service data and affecting user experience.

SUMMARY

To solve the problems existing in the related art, examples of the present disclosure provides methods and apparatuses for transmitting and obtaining uplink HARQ feedbacks to preferentially transmit HARQ feedbacks of a subframe with low latency, thereby shortening delivery time of latency-sensitive service data.

According to a first aspect of examples of the present disclosure, a method of transmitting uplink HARQ feedbacks is provided, which is applied to user equipment. The method includes:

obtaining a service priority ordered list associated with a plurality of downlink subframes;

generating to-be-sent HARQ feedbacks by bundling HARQ feedbacks associated with downlink subframes in a descending order of service priorities based on the service priority ordered list;

successively assigning uplink subframes for the to-be-sent HARQ feedbacks to transmit the to-be-sent HARQ feedbacks to a base station.

Optionally, obtaining the service priority ordered list associated with the plurality of downlink subframes includes:

receiving the service priority ordered list associated with the plurality of downlink subframes within a preset time window from the base station, where the service priority ordered list includes a plurality of subframe identifiers sorted based on a preset service priority order.

Optionally, obtaining the service priority ordered list associated with the plurality of downlink subframes includes:

obtaining a service type and a subframe identifier associated with each downlink subframe within a preset time window;

determining a service priority associated with each subframe identifier by querying a preset priority classification list based on the service type, where the preset priority classification list includes a relationship between the service type and the service priority; and generating the service priority ordered list by sorting the plurality of subframe identifiers based on a preset service priority order.

Optionally, generating the service priority ordered list by sorting the plurality of subframe identifiers based on the preset service priority order includes:

in a case that a number of the subframe identifiers with a same priority is greater than a preset bundling number, sorting the subframe identifiers with the same priority based on a receiving sequence of the plurality of downlink subframes.

Optionally, bundling the HARQ feedbacks associated with the downlink subframes in the descending order of the service priorities based on the service priority ordered list includes:

based on the service priority ordered list, successively bundling HARQ feedbacks corresponding to a preset bundling number of subframe identifiers in a descending order of the service priorities.

Optionally, bundling the HARQ feedbacks associated with the downlink subframes in the descending order of the service priorities based on the service priority ordered list includes:

dividing the service priority ordered list into a plurality of sub-lists, where each sub-list includes subframe identifiers with a same priority; and based on a descending order of the service priorities and a preset bundling number, successively bundling the HARQ feedbacks associated with the subframe identifiers in each sub-list.

Optionally, bundling the HARQ feedbacks associated with the downlink subframes in the descending order of the service priorities based on the service priority ordered list includes:

based on the service priorities and a preset bundling number, performing classification bundling for the HARQ feedbacks associated with the downlink subframes with a preset priority, and performing sequence bundling for the HARQ feedbacks associated with the downlink subframes with remaining priorities.

According to a second aspect of examples of the present disclosure, a method of obtaining uplink HARQ feedbacks is provided, which is applied to a base station. The method includes:

determining service priorities associated with a plurality of downlink subframes;

obtaining a service priority ordered list by sorting the service priorities associated with the plurality of downlink subframes based on preset priority sorting information;

transmitting the service priority ordered list to user equipment, so that the user equipment is enabled to bundle HARQ feedbacks associated with downlink subframes based on the service priority ordered list and assign uplink subframes for bundled HARQ feedbacks;

receiving uplink HARQ feedbacks returned by the user equipment; and analyzing the uplink HARQ feedbacks based on the service priority ordered list and a preset bundling number.

Optionally, determining the service priorities associated with the plurality of downlink subframes includes:

recording subframe identifiers and service types associated with the plurality of downlink subframes; and determining the service priority associated with each subframe identifier by querying a preset priority classification list based on the service type associated with each downlink subframe, where the preset priority classification list includes a relationship between the service type and the service priority.

Optionally, before the preset priority classification list is queried based on the service type associated with each downlink subframe, the method further includes:

determining the preset priority classification list associated with user equipment based on equipment information of the user equipment.

According to a third aspect of examples of the present disclosure, apparatus for transmitting uplink HARQ feedbacks is provided, which is set in user equipment. The apparatus includes:

a sorting information obtaining module, configured to obtain a service priority ordered list associated with a plurality of downlink subframes;

a bundling module, configured to generate to-be-sent HARQ feedbacks by bundling HARQ feedbacks associated with downlink subframes in a descending order of service priorities based on the service priority ordered list; and a transmitting module, configured to successively assign uplink subframes for the to-be-sent HARQ feedbacks to transmit the to-be-sent HARQ feedbacks to a base station.

Optionally, the sorting information obtaining module includes:

an information receiving sub-module, configured to receive the service priority ordered list associated with the plurality of downlink subframes within a preset time window from the base station, where the service priority ordered list includes the plurality of subframe identifiers sorted based on a preset service priority order.

Optionally, the sorting information obtaining module includes:

a subframe information obtaining sub-module, configured to obtain a service type and a subframe identifier associated with each downlink subframne within a preset time window;

a priority determining sub-module, configured to determine a service priority associated with each subframe identifier by querying a preset priority classification list based on the service type, where the preset priority classification list includes a relationship between the service type and the service priority; and a sorting sub-module, configured to generate the service priority ordered list by sorting the plurality of subframe identifiers based on a preset service priority order.

Optionally, the sorting sub-module includes:

a sorting unit, configured to sort the subframe identifiers with the same priority based on a receiving sequence of the plurality of downlink subframes in a case that a number of the subframe identifiers with a same priority is greater than a preset bundling number.

Optionally, the bundling module includes:

a first bundling sub-module, configured to successively bundle HARQ feedbacks corresponding to a preset bundling number of subframe identifiers in a descending order of the service priorities based on the service priority ordered list.

Optionally, the bundling module includes:

a list dividing sub-module, configured to divide the service priority ordered list into a plurality of sub-lists, where each sub-list includes subframe identifiers with a same priority; and a second bundling sub-module, configured to successively bundle the HARQ feedbacks associated with the subframe identifiers in each sub-list based on a descending order of the service priorities and a preset bundling number.

Optionally, the bundling module includes:

a third bundling sub-module, configured to perform classification bundling for the HARQ feedbacks associated with the downlink subframes with a preset priority, and perform sequence bundling for the HARQ feedbacks associated with the downlink subframes with remaining priorities based on the service priorities and a preset bundling number.

According to a fourth aspect of examples of the present disclosure, apparatus for obtaining uplink HARQ feedbacks is provided, which is set in a base station. The apparatus includes:

a priority determining module, configured to determine service priorities associated with a plurality of downlink subframes;

a sorting module, configured to obtain a service priority ordered list by sorting the service priorities associated with the plurality of downlink subframes based on preset priority sorting information;

a sorting information transmitting module, configured to transmit the service priority ordered list to user equipment, so that the user equipment is enabled to bundle HARQ feedbacks associated with downlink subframes based on the service priority ordered list and assign uplink subframes for bundled HARQ feedbacks; and an analyzing module, configured to receive uplink HARQ feedbacks returned by the user equipment; and analyze the uplink HARQ feedbacks based on the service priority ordered list and a preset bundling number.

Optionally, the priority determining module includes:

a subframe information recording sub-module, configured to record subframe identifiers and service types associated with the plurality of downlink subframes; and a priority determining sub-module, configured to determine the service priority associated with each subframe identifier by querying a preset priority classification list based on the service type associated with each downlink subframe, where the preset priority classification list includes a relationship between the service type and the service priority.

Optionally, the priority determining module also includes:

a division list determining sub-module, configured to determine the preset priority classification list associated with user equipment based on equipment information of the user equipment.

According to a fifth aspect of examples of the present disclosure, apparatus for transmitting uplink HARQ feedbacks is provided, including: a processor; and a memory for storing instructions executable by the processor;

where the processor is configured to:

obtain a service priority ordered list associated with a plurality of downlink subframes;

based on the service priority ordered list, generate to-be-sent HARQ feedbacks by bundling HARQ feedbacks associated with downlink subframes in a descending order of service priorities;

successively assigning uplink subframes for the to-be-sent HARQ feedbacks to transmit the to-be-sent HARQ feedbacks to a base station.

According to a sixth aspect of examples of the present disclosure, apparatus for obtaining uplink HARQ feedbacks is provided, including:

a processor; and a memory storing instructions executable by the processor;

where the processor is configured to determine service priorities associated with a plurality of downlink subframes;

obtain a service priority ordered list by sorting the service priorities associated with the plurality of downlink subframes based on preset priority sorting information;

transmit the service priority ordered list to user equipment, so that the user equipment is enabled to bundle HARQ feedbacks associated with downlink subframes based on the service priority ordered list and assign uplink subframes for bundled HARQ feedbacks;

receive uplink HARQ feedbacks returned by the user equipment; and analyze the uplink HARQ feedbacks based on the service priority ordered list and a preset bundling number.

The technical solutions provided by examples of the present disclosure may include the following benefits.

In the present disclosure, after obtaining the HARQ feedback associated with each downlink subframe, the user equipment may firstly obtain a service priority ordered list associated with each downlink subframe, then generate to-be-sent HARQ feedbacks by bundling HARQ feedbacks associated with downlink subframes in a descending order of service priorities, and successively assign uplink subframes for the to-be-sent HARQ feedbacks, such that the base station preferentially obtains the HARQ feedbacks associated with the downlink subframes with higher service priority, thereby preferentially determining whether to re-transmit latency-sensitive service data. In this way, the latency-sensitive service data is transmitted to the user equipment preferentially, thereby improving user experience of the latency-sensitive services.

In the present disclosure, the user equipment may receive the service priority ordered list associated with the plurality of downlink subframes within a preset time window from the base station in real time, and then bundle the HARQ feedbacks based on the service priority ordered list. Since it is not required to perform data processing for service priority sorting, memory requirements of the user equipment may be reduced and data processing efficiency may be improved, thereby further shortening HARQ feedbacks latency.

In the present disclosure, the user equipment may also firstly determine a service priority associated with respective downlink subframes based on a pre-stored preset priority classification list, and then sort the service priorities in a preset order to obtain the service priority ordered list as a reference basis for subsequent feedbacks bundling. Since the user equipment and the base station both store the same priority ordered list, the user equipment may sort service priorities after receiving downlink subframes, and does not need to wait for the base station to distribute the corresponding service priority ordered list. In this way, increasing control signaling overhead may be avoided, data transmission amount may be reduced, and data transmission channel resources may be saved.

In the present disclosure, during a process of sorting the service priorities, if a plurality of downlink subframes have a same service priority, especially when a number of the plurality of downlink subframes with the same service priority is greater than a preset bundling number, the subframe identifiers associated with the plurality of downlink subframes may be sorted based on a receiving sequence of the plurality of downlink subframes. In this way, on the basis of preferentially transmitting the HARQ feedbacks with a higher priority, the sequence of transmitting the HARQ feedbacks may be guaranteed and the HARQ feedbacks associated with the latency-sensitive subframes can be transmitted reasonably.

In the present disclosure, when the HARQ feedbacks associated with respective downlink subframes are bundled based on the service priority ordered list. HARQ feedbacks corresponding to a preset bundling number of subframe identifiers may be successively bundled in a descending order of the service priorities. The quantity of to-be-sent HARQ feedbacks may be reduced while the HARQ feedbacks with higher priorities is preferentially transmitted, thereby saving uplink resources.

In the present disclosure, the service priority ordered list including all subframe identifiers may be divided into a plurality of sub-lists based on service priorities, where each sub-list records the subframe identifiers with a same service priority. Then, the HARQ feedbacks associated with the subframe identifiers are bundled in each sub-list based on a descending order of the service priorities. When the number of subframe identifiers in a sub-list with a higher service priority is less than a preset bundling number, a nearest available uplink subframe may be assigned for the HARQ feedback associated with the subframe identifier separately, such that the HARQ feedbacks associated with the latency-sensitive subframes with a higher service priority may be preferentially transmitted to the base station, thereby ensuring that the user equipment may preferentially obtain the data of the latency-sensitive services.

In the present disclosure, when HARQ feedbacks associated with respective downlink subframes are bundled based on the service priority ordered list, classification bundling may be performed for the HARQ feedbacks associated with the downlink subframes with a preset priority, and sequence bundling may be performed for the HARQ feedbacks associated with the downlink subframes with remaining priorities in a descending order of the service priorities based on a preset bundling number. It is guaranteed that the HARQ feedbacks associated with latency-sensitive subframes with a preset type may be preferentially transmitted to the base station. At same time, the HARQ feedbacks associated with subsequent latency-insensitive services may be prevented from occupying more uplink resources.

It is understood that the above general descriptions and the following detailed descriptions are merely illustrative and explanatory and are not intended to limit the present disclosure.

BRIEF DESCRIPTION OF DRAWINGS

The accompanying drawings, which are incorporated in and constitute a part of the present specification, illustrate examples coincident with the present disclosure and serve to explain the principles of the present disclosure together with the specification.

FIG. 5-1 is a schematic diagram illustrating assigned uplink subframes for HARQ feedbacks associated with downlink subframes in related art according to an example.

FIG. 5-2 is a schematic diagram illustrating assigned uplink subframes for HARQ feedbacks associated with downlink subframes according to an example of the present disclosure.

DETAILED DESCRIPTION

Figure 1:
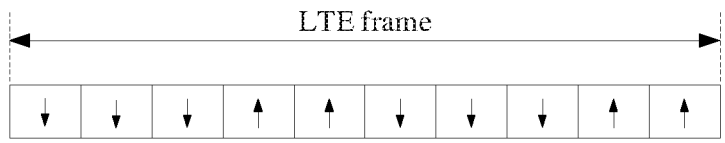
FIG. 1 is schematic diagram illustrating a structure of an LTE frame according to an example of the present disclosure.

Hereinafter, an embodiment will be described in detail, examples of which are shown in the drawings. When the following descriptions refer to the drawings, the same numerals in the different drawings denote the same or similar elements unless otherwise indicated. The embodiments described in the following examples are not representative of all embodiments coincident with the present disclosure. Rather, they are merely examples of apparatuses and methods coincident with some aspects of the present disclosure as detailed in the appended claims.

The term used in the present disclosure is for the purpose of describing a particular example only, and is not intended to be limiting of the present disclosure. The singular forms such as "a", 'said", and "the" used in the present disclosure and the appended claims are also intended to include multiple, unless the context clearly indicates otherwise. It is also to be understood that the term "and/or" as used herein refers to any or all possible combinations that include one or more associated listed items.

It is to be understood that although different information may be described using the terms such as first, second, third, etc. in the present disclosure, such information should not be limited to these terms. These terms are used only to distinguish the same type of information from each other. For example, the first information may also be referred to as the second information without departing from the scope of the present disclosure, and similarly, the second information may also be referred to as the first information. Depending on the context, the word "if" as used herein may be interpreted as "when" or "as" or "determining in response to".

In an LTE TDD system, one frame in a data transmission link includes uplink subframes and downlink subframes. FIG. 1 illustrates the structure of an LTE frame. One LTE frame is 10 ms and includes ten subframes. The subframe number is 0-9. As shown in FIG. 1, the subframe with arrow down indicates a downlink subframe and the subframe with arrow up indicates an uplink subframe. The downlink subframe is a subframe in which a base station transmits information to user equipment and the uplink subframe is a subframe in which the user equipment transmits information to the base station. FIG. 1 only exemplarily illustrates a ratio relationship in which a number of the downlink subframes is greater than a number of the uplink subframes. A specific ratio value shall not be interpreted as limiting of the present disclosure.

A HARQ mechanism of the present disclosure will be described below. In the HARQ transmission mechanism, after continuously sending several downlink subframes to the user equipment, the base station may pause and wait for receiving HARQ feedbacks sent by the user equipment. The user equipment will perform error detection for each received downlink subframe. If reception error does not occur, an acknowledgement (ACK) signal may be generated; and if reception error occurs, a negative-acknowledgement (NACK) signal may be generated. When the downlink resource is configured more than the uplink resource in the resource allocation, the user equipment may multiplex the above several HARQ feedbacks, i.e., ACK/NACK signals, to obtain to-be-sent HARQ feedbacks with multiple bits, and send the to-be-sent HARQ feedbacks with multiple bits to the base station through an assigned uplink feedback resource. If the base station receives the ACK signal, the base station may send a new downlink subframe to the user equipment. If the base station receives the NACK signal, the base station may re-transmit the downlink subframe which has been sent last time.

Based on this, a method of transmitting uplink HARQ feedbacks is provided by the present disclosure, which may be applied to user equipment with constrained power.

The user equipment in the present disclosure may be any terminal with a mobile communication function, such as, a mobile phone, a tablet computer, a Personal Digital Assistant (PDA), and so on.

Figure 2:
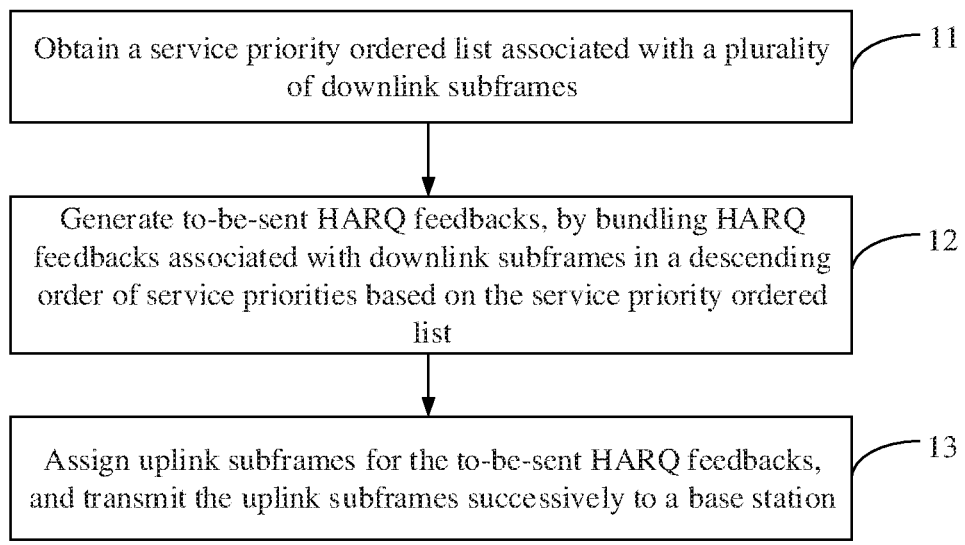
FIG. 2 is a flowchart illustrating a method of transmitting uplink HARQ feedbacks according to an example of the present disclosure.

FIG. 2 is a flowchart illustrating a method of transmitting uplink HARQ feedbacks according to an example of the present disclosure. The method may include the following steps.

At step 11, a service priority ordered list associated with a plurality of downlink subframes is obtained.

In an example of the present disclosure, a specific time window may be preset between the base station and the user equipment. The preset time window may refer to a time length in which the user equipment continuously receives a preset number of downlink subframes in the LTE TDD downlink. In the LTE TDD system, the length of the above preset time window may be represented by the preset number of subframes, for example, 2-9 subframes. In a specific implementation, the base station may assign the information of the specific time window in control signaling and send the control signaling to the user equipment.

The user equipment may obtain a service priority ordered list associated with a plurality of downlink subframes after obtaining the plurality of downlink subframes within each preset time window.

Taking the preset time window including four downlink subframes as an example, when each time the user equipment receives four downlink subframes, a service priority ordered list associated with the four downlink subframes may be obtained. The service priority ordered list records sorted four sorted subframe identifiers in a preset service priority order, such as, a descending order.

In examples of the present disclosure, the user equipment may obtain the service priority ordered list in the following manners.

In the first manner: the service priority ordered list associated with the plurality of downlink subframes within the preset time window is received from a base station.

Assuming that the base station transmits four downlink subframes to user equipment, each downlink subframe may carry information such as a subframe identifier, packet service data, a service type and so on. The base station may obtain the subframe identifier and the service type associated with each downlink subframe and then determine a service priority for each downlink subframe based on a preset priority classification list, where the preset priority classification list records a relationship between the service type and the service priority. Then the base station may obtain the service priority ordered list associated with the four downlink subframes by sorting the four subframe identifiers associated with the four downlink subframes based on a descending order of the service priorities. The base station may transmit the service priority ordered list to the user equipment in real time. For example, the base station may assign the service priority ordered list associated with the four downlink subframes in unicast signaling and transmit the unicast signaling to the user equipment.

In the second manner: user equipment may obtain the service priority ordered list associated with the plurality of downlink subframes based on pre-stored information of service priorities.

Figure 3:
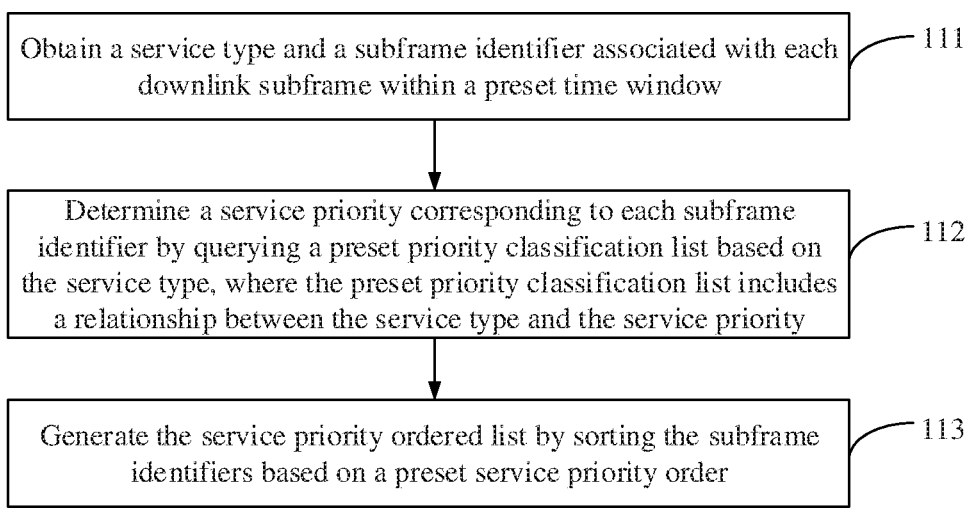
FIG. 3 is a flowchart illustrating a method of transmitting uplink HARQ feedbacks according to another example of the present disclosure.

FIG. 3 is a flowchart illustrating a method of transmitting uplink HARQ feedbacks according to an example of the present disclosure. Above step 11 may include:

at step 111, a service type and a subframe identifier associated with each downlink subframe within the preset time window are obtained.

The user equipment may obtain the subframe identifier and the service type associated with each downlink subframe by performing information extraction for each downlink subframe received within the preset time window. Still taking the above four downlink subframes within the preset time window as an example, it is assumed that the four subframe identifiers and corresponding service types are: subframe 0: mMTC service; subframe 1: URLLC service; subframe 2: URLLC service; and subframe 3: enhanced Mobile Broad Band (eMBB) service.

At step 112, a service priority associated with each subframe identifier is determined by querying a preset priority classification list based on the service type. The preset priority classification list includes a relationship between the service type and the service priority.

In the present disclosure, the preset priority classification list may be a priority determination basis pre-agreed between the base station and the user equipment.

In an example, the priority classification list may be general, that is, all user equipment may determine the service priorities associated with the plurality of received downlink subframes based on the priority classification list. After determining the preset priority classification list, the base station may assign the priority classification list in broadcast signaling and send the broadcast signaling to all user equipment in a cell.

In another example, the preset priority classification list may also be a priority classification list for a certain class of user equipment or a certain piece of user equipment. For example, if the user equipment is mMTC equipment, the mMTC service type in the priority classification list may be set to the highest priority. A relationship between equipment information of the user equipment and the priority classification list may be pre-stored in the base station, so that the base station may analyze the bundled HARQ feedbacks sent by the user equipment subsequently.

In an example of the present disclosure, it is assumed that the above preset priority classification list is shown in Table 1.

TABLE 1

| Service type | Service priority |
| --- | --- |
| URLLC | First priority |
| mMTC | Second priority |
| eMBB | Third priority |

According to Table 1, the service priorities of the four downlink subframes may be determined as follows: subframe 0: second priority; subframe 1: first priority; subframe 2: first priority; and subframe 3: third priority.

It is noted that the above Table 1 merely illustrates that one service priority corresponds to one service type. In another example of the present disclosure, one service priority may correspond to two or more service types when assigning the priority classification list. For example, if there are a plurality of latency-sensitive service types, the plurality of latency-sensitive service types may correspond to the first priority when assigning the priority classification list.

At step 113, the service priority ordered list is generated by sorting the plurality of subframe identifiers based on a preset service priority order.

The preset service priority order may be a descending order or an ascending order. Taking the descending order as an example, if the first priority is the highest service priority, as shown in Table 2, the service priority ordered list may be obtained by sorting the four subframe identifiers associated with the above four downlink subframes in the descending order of the service priorities.

TABLE 2

| Subframe identifier | Service priority |
| --- | --- |
| 1 | First priority |
| 2 | First priority |
| 0 | Second priority |
| 3 | Third priority |

Further, when a plurality of subframes within a preset time window have a same service priority, especially, in a case that a number of the subframe identifiers with a same priority is greater than a preset bundling number, the subframe identifiers may be sorted based on a receiving sequence of the subframes with the same priority. For example, assuming that the preset time window includes five downlink subframes, a fifth downlink subframe is included on the basis of the above example. The relationship between the subframe identifier and the service type associated with the downlink subframe may be: subframe 4: URLLC service. In the LTE TDD system, a receiving sequence of the five downlink subframes may be as follows: 0, 1, 2, 3, and 4. If the entire list is sorted based on a descending order of the service priorities, three subframe identifiers with the same priority, that is, the first priority, may be sorted as follows: 1, 2, and 4. The corresponding service priority ordered list may be shown in Table 3.

TABLE 3

| Subframe identifier | Service priority |
| --- | --- |
| 1 | First priority |
| 2 | First priority |
| 4 | First priority |
| 0 | Second priority |
| 3 | Third priority |

At step 12, based on the service priority ordered list, to-be-sent HARQ feedbacks are obtained by bundling HARQ feedbacks associated with the downlink subframes in a descending order of service priorities.

According to the related art, user equipment may generate a corresponding HARQ feedback, such as an ACK signal or a NACK signal, by performing error detection for each received downlink subframe. Bundling the HARQ feedbacks associated with the downlink subframes refers to generating a one-bit HARQ feedback by performing logical AND operation for the HARQ feedbacks, i.e., the ACK signal or the NACK signal, associated with the subframe identifiers based on a preset bundling number, thereby saving uplink feedback resources.

After the user equipment performs error detection for data in the five downlink subframes recorded in Table 3, it is assumed that the generated HARQ feedbacks are respectively as follows: subframe 0: ACK; subframe 1: ACK; subframe 2: NACK; subframe 3: NACK; and subframe 4: ACK. In combination with the above Table 3 and the HARQ feedback associated with each subframe, a to-be-bundled list may be generated, as shown in Table 4.

TABLE 4

| Subframe identifier | Service priority | HARQ feedback |
| --- | --- | --- |
| 1 | First priority | ACK |
| 2 | First priority | NACK |
| 4 | First priority | ACK |
| 0 | Second priority | ACK |
| 3 | Third priority | NACK |

In the present disclosure, after the to-be-bundled list is determined, the HARQ feedbacks associated with the downlink subframes may be bundled in the following manners.

In the first manner: based on the service priority ordered list, the HARQ feedbacks corresponding to a preset bundling number of subframe identifiers are successively bundled in a descending order of the service priorities.

Assuming that the preset bundling number pre-agreed between the base station and the user equipment is 2, based on the above Table 4, at first, performing logical AND operation for the HARQ feedbacks associated with the subframes 1 and 2 to obtain a bundled HARQ feedback, which is NACK. Then, performing logical AND operation for the HARQ feedbacks associated with the subframes 4 and 0 to obtain a bundled HARQ feedback, which is ACK. The HARQ feedback associated with the subframe 3 is not bundled.

In the second manner: based on a descending order of the service priorities, classification bundling is performed for the HARQ feedbacks with different priorities.

Figure 4:
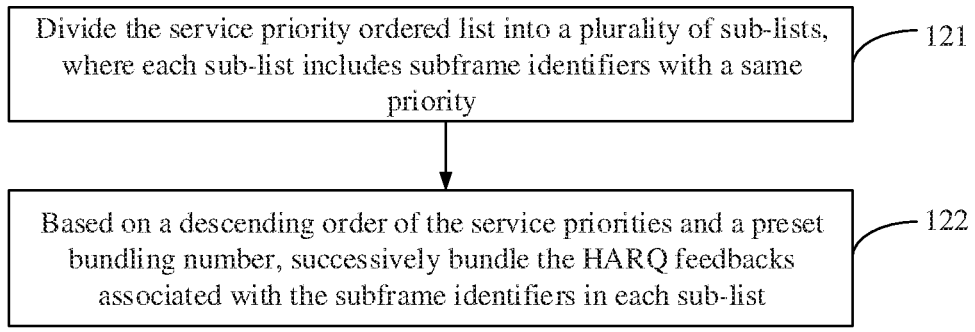
FIG. 4 is a flowchart illustrating a method of transmitting uplink HARQ feedbacks according to another example of the present disclosure.

FIG. 4 is a flowchart illustrating a method of transmitting uplink HARQ feedbacks according to another example of the present disclosure. The above step 12 may include:

at step 121, the service priority ordered list may be divided into a plurality of sub-lists, where each sub-list includes subframe identifiers with a same priority.

Still taking the above Table 3 as an example, the Table 3 may be divided into three sub-lists based on respective service priorities. As shown in Table 3-1, the first sub-list corresponds to the first priority.

TABLE 3-1

| Subframe identifier | Service priority |
| --- | --- |
| 1 | First priority |
| 2 | First priority |
| 4 | First priority |

As shown in Table 3-2, the second sub-list corresponds to the second priority.

TABLE 3-2

| Subframe identifier | Service priority |
|---|---|
| 0 | Second priority |

As shown in Table 3-3, the third sub-list corresponds to the third priority.

TABLE 3-3

| Subframe identifier | Service priority |
|---|---|
| 3 | Third priority |

At step 122, n a descending order of the service priorities, the HARQ feedbacks associated with the subframe identifiers in each sub-list are successively bundled based on a preset bundling number.

Still taking the preset bundling number being 2 as an example, a process of bundling the HARQ feedbacks associated with the downlink subframes recorded in the above three sub-lists is described below.

Performing logical AND operation for the HARQ feedbacks associated with the subframes 1 and 2 in the first sub-list to obtain a bundled HARQ feedback, which is NACK. The HARQ feedback associated with the subframe 4 is not bundled. Since the numbers of the subframe identifiers in the second and the third sub-lists are both less than the preset bundling number, the HARQ feedbacks associated with the subframes 0 and 3 are not bundled.

In the third manner: classification bundling is performed for the feedbacks associated with the downlink subframes with a preset priority, and sequence bundling is performed for the feedbacks associated with the downlink subframes with remaining priorities.

Still taking the preset multiplexing number being 2 as an example, the base station and the user equipment agree to perform classification bundling for the HARQ feedbacks associated with the subframe identifiers with the first priority. Based on the above Table 4, at first, performing logical AND operation for the HARQ feedbacks associated with the subframes 1 and 2 to obtain a bundled HARQ feedback, which is NACK. The HARQ feedback associated with the subframe 4 is not bundled. Then, performing logical AND operation for the HARQ feedbacks associated with the subframes 0 and 3 to obtain a bundled HARQ feedback, which is NACK.

At step 13, uplink subframes are successively assigned for the to-be-sent HARQ feedbacks to transmit the to-be-sent HARQ feedbacks to a base station.

Uplink subframes are successively assigned for the to-be-sent HARQ feedbacks, where the assigned uplink subframe is a nearest uplink subframe available for sending the HARQ feedbacks.

Figures 1, 5:
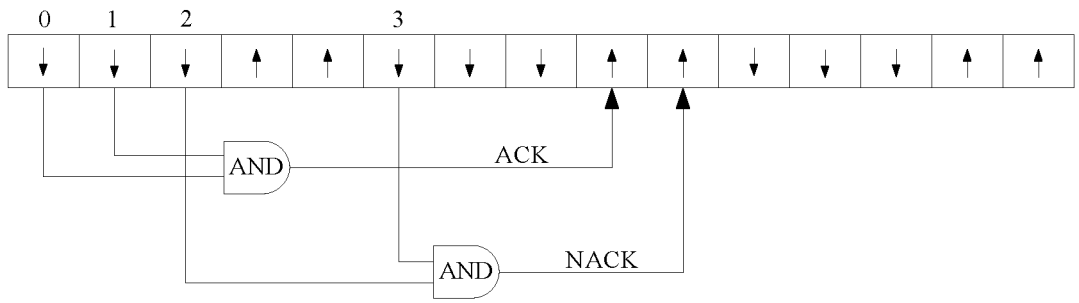
Figures 2, 5:
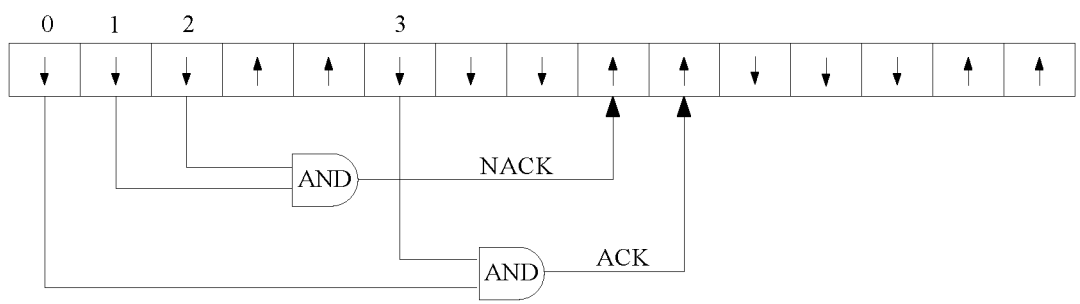

FIG. 5-1 is a schematic diagram illustrating assigned uplink subframes for HARQ feedbacks associated with downlink subframes recorded in Table 2 according to the related art. Based on a receiving sequence. HARQ feedbacks associated with every two downlink subframes are bundled, and then an available nearest uplink subframe is assigned for the one-bit bundled HARQ feedback. That is, at first, an uplink subframe is assigned for bundled feedback ACK associated with the downlink subframes 0 and 1. Then, an uplink subframe is assigned for bundled feedback NACK associated with the downlink subframes 2 and 3.

FIG. 5-2 is a schematic diagram illustrating assigned uplink subframes for downlink subframes recorded in Table 2 according to an example of the present disclosure. The HARQ feedbacks associated with the subframes 1 and 2 having the highest service priorities are bundled at first, and a nearest uplink subframe is assigned for the one-bit bundled HARQ feedback. Then the HARQ feedbacks associated with the subframes 0 and 3 having lower service priorities are bundled according to the above first bundling manner, and an uplink subframe is assigned for the bundled feedback.

By comparing FIG. 5-2 with FIG. 5-1, with the method of transmitting HARQ feedbacks provided by examples of the present disclosure, the HARQ feedbacks with higher service priorities may preferentially occupy the uplink subframes for transmitting HARQ feedbacks. Therefore, service data with higher latency requirements may be preferentially delivered to the user equipment, and user experiences can be improved.

Figure 6:
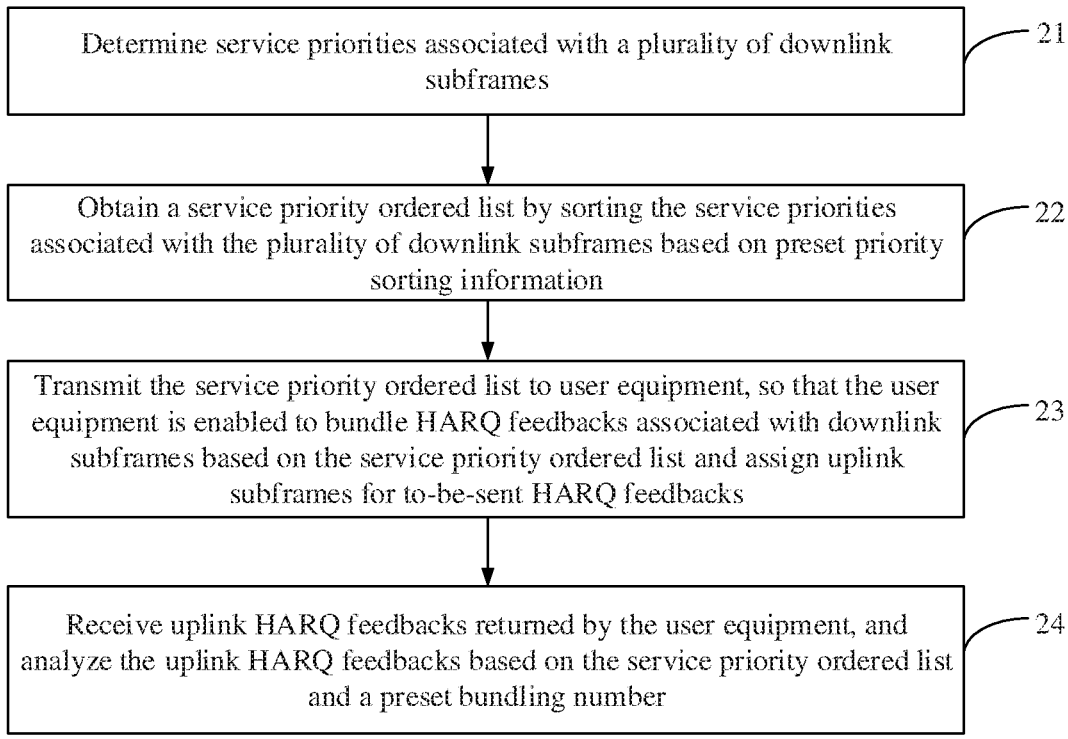
FIG. 6 is a flowchart illustrating a method of obtaining uplink HARQ feedbacks according to an example of the present disclosure.

Correspondingly, the present disclosure also provides a method of obtaining uplink HARQ feedbacks, which may be applied to a base station. FIG. 6 is a flowchart illustrating a method of obtaining uplink HARQ feedbacks according to an example of the present disclosure. The method may include the following steps.

At step 21, service priorities associated with a plurality of downlink subframes are determined.

Figure 7:
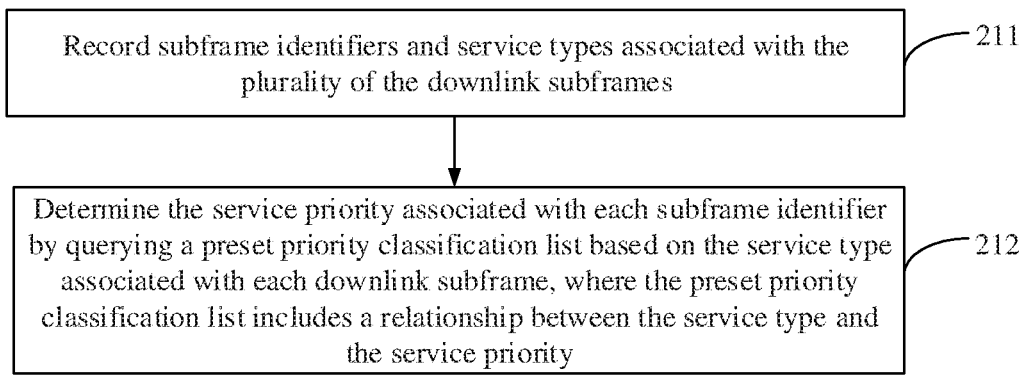
FIG. 7 is a flowchart illustrating a method of obtaining uplink HARQ feedbacks according to another example of the present disclosure.

Specifically, FIG. 7 is a flowchart illustrating a method of obtaining uplink HARQ feedbacks according to another example of the present disclosure. The step 21 may include:

at step 211, subframe identifiers and service types associated with the plurality of downlink subframes are recorded.

In the present disclosure, the base station may record subframe identifiers and service types associated with the plurality of downlink subframes within a preset time window that are sent to a certain piece of user equipment.

At step 212, the service priority associated with each subframe identifier is determined by querying a preset priority classification list based on the service type associated with each downlink subframe, where the preset priority classification list includes a relationship between the service type and the service priority.

Figure 8:
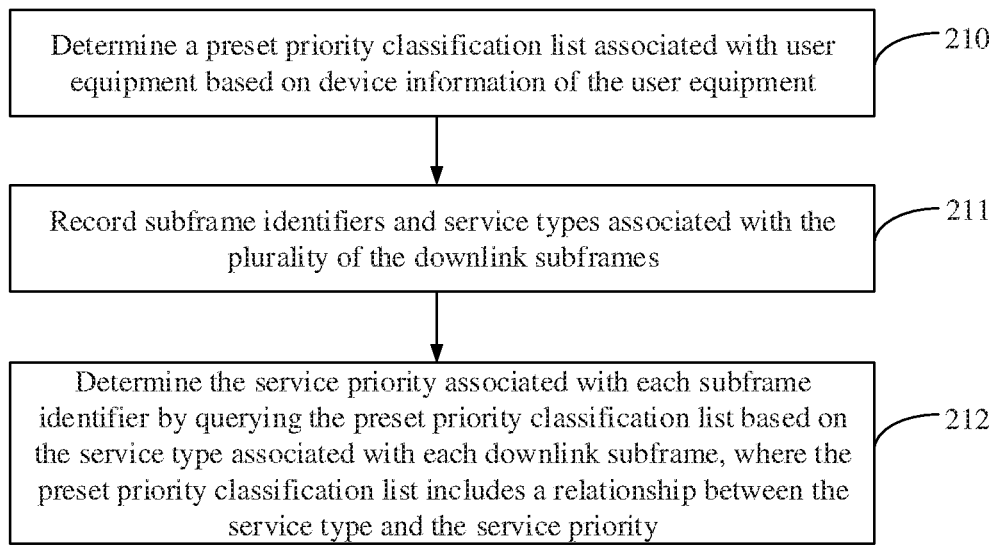
FIG. 8 is a flowchart illustrating a method of obtaining uplink HARQ feedbacks according to another example of the present disclosure.

FIG. 8 is a flowchart illustrating a method of obtaining uplink HARQ feedbacks according to another example of the present disclosure. Before the above step 211, the step 21 may also include:

at step 210, the preset priority classification list associated with user equipment is determined based on equipment information of the user equipment, where the equipment information of the user equipment may be an equipment type or an identifier of the user equipment.

In an example, priority classification lists associated with different types of user equipment may be pre-stored in a mobile communication network server associated with a base station, or in a more personalized manner, a priority classification list associated with each user equipment may be pre-stored. As an example, an eMTC service type may be configured to the highest priority, such as the first priority, in a priority classification list associated with eMTC type user equipment. The preset priority classification list may be a list sent to the base station for storing after the user equipment performs priority configuration and storage. The preset priority classification lists determined by examples of the present disclosure may meet personalized requirements of different user equipment.

At step 22, a service priority ordered list is obtained by sorting the service priorities associated with the plurality of downlink subframes in a preset service priority order.

The preset service priority order may be a descending order or an ascending order.

In the present disclosure, after the service priority associated with each downlink subframe is determined, the service priority ordered list associated with the plurality of downlink subframes may be obtained by sorting the plurality of subframe identifiers associated with respective downlink subframes in a descending order of the service priorities. The service priority ordered list may include a relationship between the service priority and the subframe identifier, which are sorted in a descending order of service priorities, as shown in the above Table 2 or Table 3.

In another example of the present disclosure, the service priority ordered list may only include subframe identifiers associated with to-be-bundled feedbacks. As mentioned above, the priorities of the four downlink subframes within the preset time window may be determined as follows: subframe 0: second priority; subframe 1: first priority; subframe 2: first priority; and subframe 3: third priority. In a case that the preset bundling number is 2, the base station may obtain a service priority ordered list including only two subframe identifiers based on the priorities, as shown in Table 5.

TABLE 5

| Subframe identifier | Service priority |
|---|---|
| 1 | First priority |
| 2 | First priority |

The base station may transmit the service priority ordered list shown in Table 5 to user equipment through control signaling in real time. Compared with the service priority ordered list including all subframe identifiers shown in the above Table 2, this service priority ordered list includes less information and does not affect subsequent feedback bundling, thereby saving channel resources.

At step 23, the service priority ordered list is transmitted to user equipment, so that the user equipment is enabled to bundle HARQ feedbacks associated with downlink subframes based on the service priority ordered list and assign uplink subframe for bundled HARQ feedbacks.

At step 24, uplink HARQ feedbacks returned by the user equipment are received, and the uplink HARQ feedbacks are analyzed based on the service priority ordered list and a preset bundling number.

Since the base station and the user equipment pre-agree with a bundling number and store the same service priority ordered list, the base station may determine whether an HARQ feedback belongs to a bundled feedback after receiving the HARQ feedback from the user equipment. If yes, the base station may determine that, based on the service priority ordered list, the received HARQ feedback belongs to which downlink subframes feedbacks, thereby determining which downlink subframes need to be re-transmitted.

For example, for four downlink subframes: subframe 0: mMTC service; subframe 1: URLLC service; subframe 2: URLLC service; and subframe 3: eMBB service, the service priority ordered list determined by the base station is shown in Table 2. The preset bundling number is 2. When the first received HARQ feedback is a NACK signal, the base station may determine that the signal is a feedback generated by bundling the HARQ feedbacks associated with the subframes 1 and 2 with the highest service priority. Thus, the subframes 1 and 2 may be determined to be re-transmitted.

For subsequently received feedbacks, which subframes to be re-transmitted may be determined based on pre-agreed different bundling manners. For example, for the first bundling manner at the above step 12, after receiving a second HARQ feedback, the base station may determine that the feedback is a bundled feedback which bundling the HARQ feedbacks associated with the subframes 0 and 3. If the second HARQ feedback is a NACK signal, the downlink subframes 0 and 3 need to be re-transmitted. Corresponding to the second bundling manner at the above step 12, the base station may receive two bits HARQ feedbacks in turn, which are the HARQ feedback associated with the subframe 0 and the HARQ feedback associated with the subframe 3 respectively. The base station determines that the corresponding downlink subframe needs to be re-transmitted according to the received HARQ feedback being the ACK signal or the NACK signal.

For simplicity of descriptions, examples of above methods are expressed as a series of action combinations. However, those skilled in the art shall understand that the present disclosure is not limited by the described action sequence, because certain steps may be performed in other sequence or concurrently according to the present disclosure.

Secondly, those skilled in the art shall understand that the examples described in the specification are all optional examples, and the actions or modules involved are not necessarily required by the present disclosure.

Corresponding to the above examples of the methods, the present disclosure also provides examples of apparatus to implement the application function and a corresponding terminal.

Figure 9:
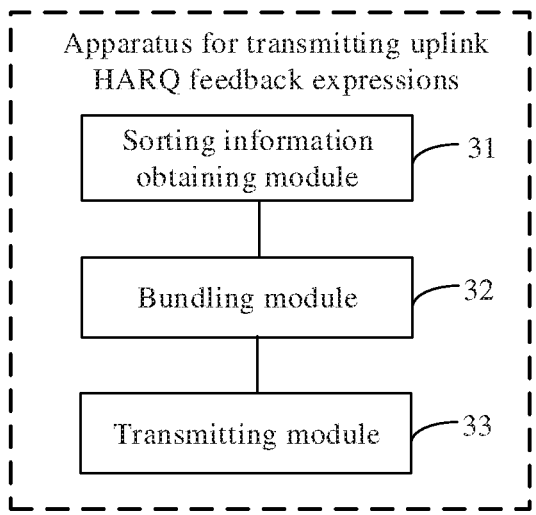
FIG. 9 is a block diagram illustrating apparatus for transmitting uplink HARQ feedbacks according to an example of the present disclosure.

FIG. 9 is a block diagram illustrating apparatus for transmitting uplink HARQ feedbacks according to an example of the present disclosure, which may be set in user equipment. The apparatus may include:

a sorting information obtaining module 31, configured to obtain a service priority ordered list associated with a plurality of downlink subframes;

a bundling module 32, configured to generate to-be-sent HARQ feedbacks by bundling HARQ feedbacks associated with downlink subframes in a descending order of service priorities based on the service priority ordered list; and a transmitting module 33, configured to successively assign uplink subframes for the to-be-sent HARQ feedbacks to transmit the to-be-sent HARQ feedbacks to a base station.

Figure 10:
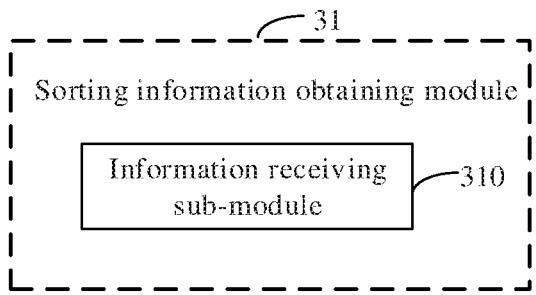
FIG. 10 is a block diagram illustrating apparatus for transmitting uplink HARQ feedbacks according to another example of the present disclosure.

FIG. 10 is a block diagram illustrating apparatus for transmitting uplink HARQ feedbacks according to another example of the present disclosure. On the basis of the example of FIG. 9, the sorting information obtaining module 31 may include:

an information receiving sub-module 310, configured to receive the service priority ordered list associated with the plurality of downlink subframes within a preset time window from the base station, where the service priority ordered list includes the plurality of subframe identifiers sorted based on a preset service priority order.

Figure 11:
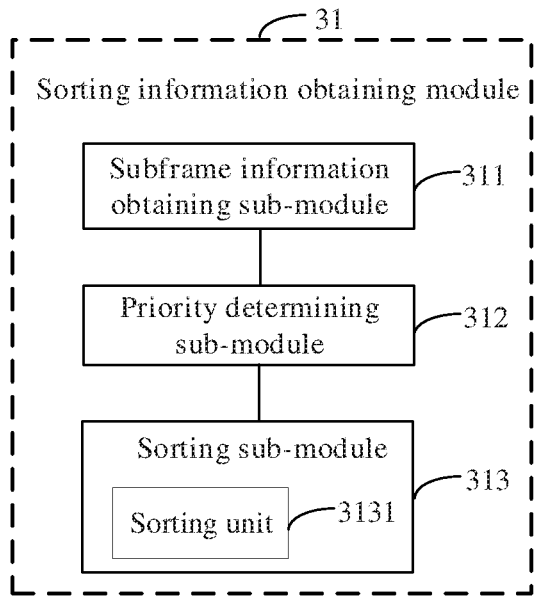
FIG. 11 is a block diagram illustrating apparatus for transmitting uplink HARQ feedbacks according to another example of the present disclosure.

FIG. 11 is a block diagram illustrating apparatus for transmitting uplink HARQ feedbacks according to another example of the present disclosure. On the basis of the example of FIG. 9, the sorting information obtaining module 31 may include:

a subframe information obtaining sub-module 311, configured to obtain a service type and a subframe identifier associated with each downlink subframe within a preset time window;

a priority determining sub-module 312, configured to determine a service priority associated with each subframe identifier by querying a preset priority classification list based on the service type, where the preset priority classification list includes a relationship between the service type and the service priority; and a sorting sub-module 313, configured to generate the service priority ordered list by sorting the plurality of subframe identifiers based on a preset service priority order.

In another example of the present disclosure, the sorting sub-module 313 also includes:

a sorting unit 3131, configured to sort the subframe identifiers with the same priority based on a receiving sequence of the plurality of downlink subframes in a case that a number of the subframe identifiers with a same priority is greater than a preset bundling number.

Figure 12:
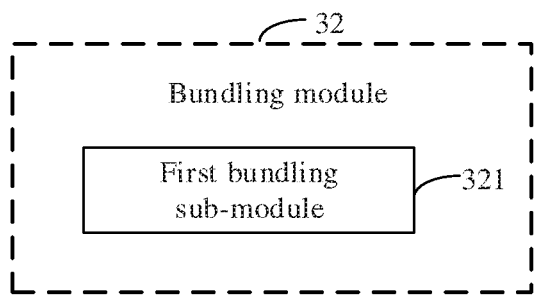
FIG. 12 is a block diagram illustrating apparatus for transmitting uplink HARQ feedbacks according to another example of the present disclosure.

FIG. 12 is a block diagram illustrating apparatus for transmitting uplink HARQ feedbacks according to another example of the present disclosure. On the basis of the example of FIG. 9, the bundling module 32 may include:

a first bundling sub-module 321, configured to successively bundle the HARQ feedbacks corresponding to a preset bundling number of subframe identifiers in a descending order of the service priorities based on the service priority ordered list.

Figure 13:
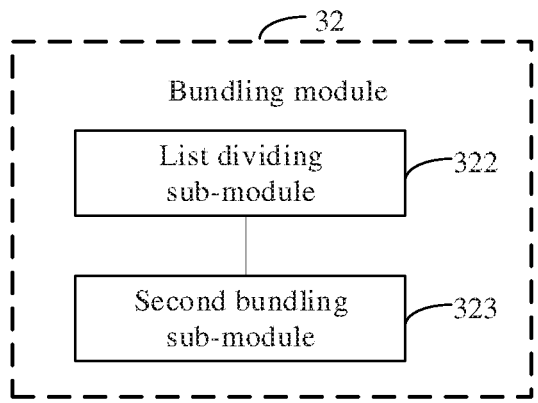
FIG. 13 is a block diagram illustrating apparatus for transmitting uplink HARQ feedbacks according to another example of the present disclosure.

FIG. 13 is a block diagram illustrating apparatus for transmitting uplink HARQ feedbacks according to another example of the present disclosure. On the basis of the example of FIG. 9, the bundling module 32 may include:

a list dividing sub-module 322, configured to divide the service priority ordered list into a plurality of sub-lists, where each sub-list includes subframe identifiers with a same priority; and a second bundling sub-module 323, configured to successively bundle the HARQ feedbacks associated with the subframe identifiers in each sub-list based on a descending order of the service priorities and a preset bundling number.

Figure 14:
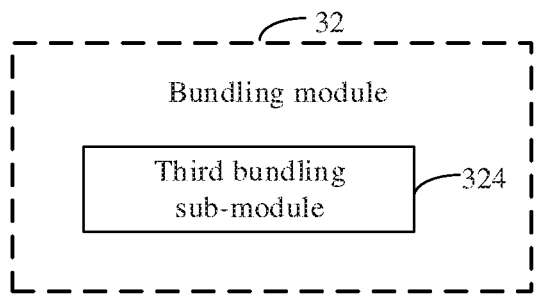
FIG. 14 is a block diagram illustrating apparatus for transmitting uplink HARQ feedbacks according to another example of the present disclosure.

FIG. 14 is a block diagram illustrating apparatus for transmitting uplink HARQ feedbacks according to another example of the present disclosure. On the basis of the example of FIG. 9, the bundling module 32 may include:

a third bundling sub-module 324, configured to perform classification bundling for the HARQ feedbacks associated with the downlink subframes with a preset priority, and perform sequence bundling for the HARQ feedbacks associated with the downlink subframes with remaining priorities based on the service priorities and a preset bundling number.

Figure 15:
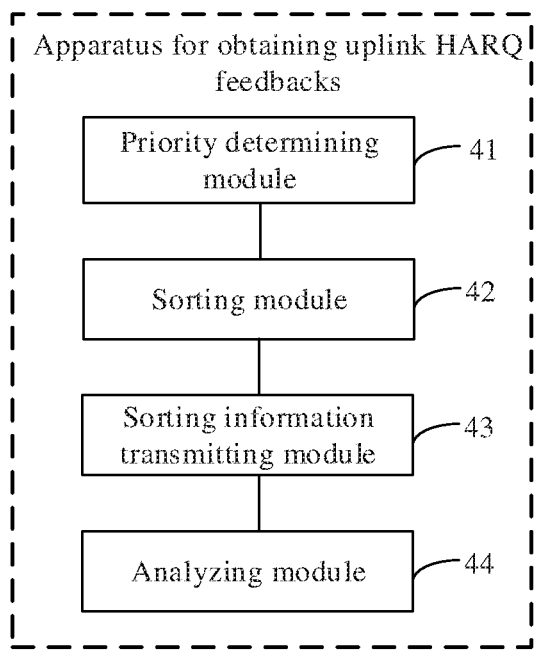
FIG. 15 is a block diagram illustrating apparatus for obtaining uplink HARQ feedbacks according to an example of the present disclosure.

Correspondingly, FIG. 15 is a block diagram illustrating apparatus for obtaining uplink HARQ feedbacks according an example of the present disclosure, which is set in a base station. The apparatus may include:

a priority determining module 41, configured to determine service priorities associated with a plurality of downlink subframes;

a sorting module 42, configured to obtain a service priority ordered list by sorting the service priorities associated with the plurality of downlink subframes based on preset priority sorting information;

a sorting information transmitting module 43, configured to transmit the service priority ordered list to user equipment, so that the user equipment is enabled to bundle HARQ feedbacks associated with downlink subframes based on the service priority ordered list and assign uplink subframes for bundled HARQ feedbacks; and an analyzing module 44, configured to receive uplink HARQ feedbacks returned by the user equipment; and analyze the uplink HARQ feedbacks based on the service priority ordered list and a preset bundling number.

Figure 16:
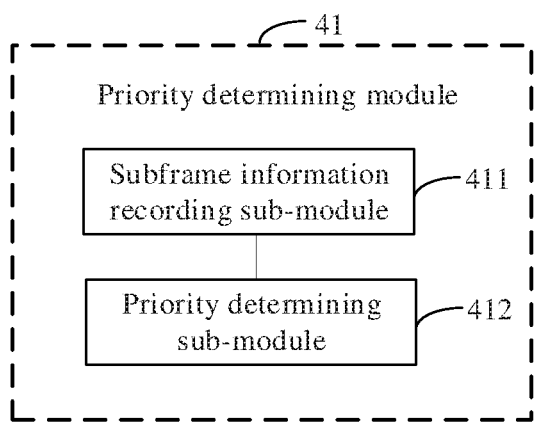
FIG. 16 is a block diagram illustrating apparatus for obtaining uplink HARQ feedbacks according to another example of the present disclosure.

FIG. 16 is a block diagram illustrating apparatus for obtaining uplink HARQ feedbacks according to another example of the present disclosure. On the basis of the example of FIG. 15, the priority determining module 41 may include:

a subframe information recording sub-module 411, configured to record subframe identifiers and service types associated with the plurality of downlink subframes; and a priority determining sub-module 412, configured to determine the service priority associated with each subframe identifier by querying a preset priority classification list based on the service type associated with each downlink subframe, where the preset priority classification list includes a relationship between the service type and the service priority.

Figure 17:
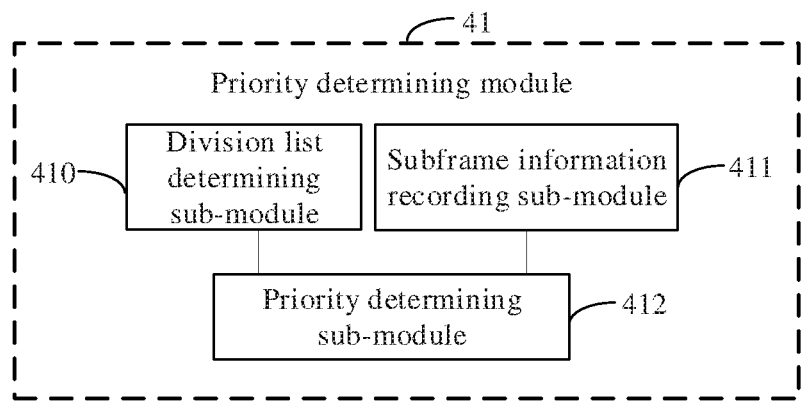
FIG. 17 is a block diagram illustrating apparatus for obtaining uplink HARQ feedbacks according to another example of the present disclosure.

FIG. 17 is a block diagram illustrating apparatus for obtaining uplink HARQ feedbacks according to another example of the present disclosure. On the basis of the example of FIG. 16, the priority determining module 41 may also include:

a division list determining sub-module 410, configured to determine the preset priority classification list associated with user equipment based on equipment information of the user equipment. For the apparatuses in the examples, the specific manners of executing operations by different modules are already detailed in the examples of relevant methods, which will not be repeated herein.

Correspondingly, on one hand, the present disclosure provides apparatus for transmitting uplink HARQ feedbacks, which may be applied to user equipment. The apparatus may include a processor, and a memory storing instructions executable by the processor. The processor may be configured to:

obtain a service priority ordered list associated with a plurality of downlink subframes; generate to-be-sent HARQ feedbacks by bundling HARQ feedbacks associated with downlink subframes in a descending order of service priorities based on the service priority ordered list;

successively assigning uplink subframes for the to-be-sent HARQ feedbacks to transmit the to-be-sent HARQ feedbacks to a base station.

On the other hand, the present disclosure provides apparatus for obtaining uplink HARQ feedbacks, which may be applied to a base station. The apparatus may include a processor and a memory for storing instructions executable by the processor. The processor is configured to:

determine service priorities associated with a plurality of downlink subframes;

obtain a service priority ordered list by sorting the service priorities associated with the plurality of downlink subframes based on preset priority sorting information;

transmit the service priority ordered list to user equipment, so that the user equipment is enabled to bundle HARQ feedbacks associated with downlink subframes based on the service priority ordered list and assign uplink subframes for bundled HARQ feedbacks;

receive uplink HARQ feedbacks returned by the user equipment; and analyze the uplink HARQ feedbacks based on the service priority ordered list and a preset bundling number.

Figure 18:
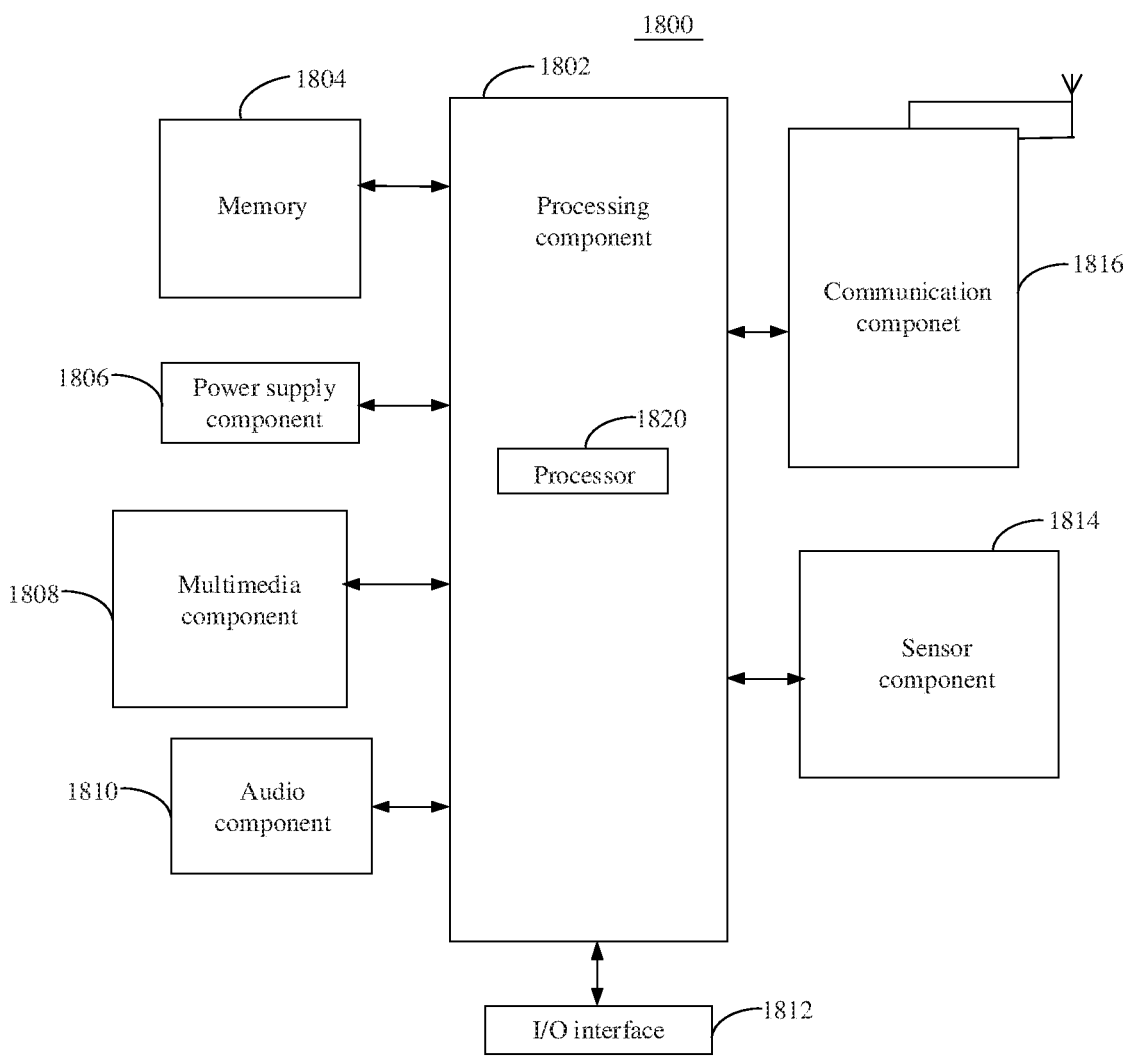
FIG. 18 is a structural diagram illustrating apparatus for transmitting uplink HARQ feedbacks according to an example of the present disclosure.

FIG. 18 is a structural diagram illustrating apparatus 1800 for transmitting uplink HARQ feedbacks according to an example of the present disclosure. For example, the apparatus 1800 may be a terminal, and may specifically be a mobile phone, a computer, a digital broadcast terminal, a message transceiver, a game console, a tablet device, a medical device, a fitness device, a personal digital assistant, and a wearable device such as a smart watch, smart glasses, a smart wristband, and smart running shoes.

As shown in FIG. 18, the apparatus 1800 may include one or more of the following components: a processing component 1802, a memory 1804, a power supply component 1806, a multimedia component 1808, an audio component 1810, an input/output (I/O) interface 1812, a sensor component 1814 and a communication component 1816.

The processing component 1802 generally controls overall operations of the apparatus 1800, such as operations associated with display, phone calls, data communications, camera operations, and recording operations. The processing component 1802 may include one or more processors 1820 for executing instructions to complete all or a part of steps of the above method. In addition, the processing component 1802 may include one or more modules which facilitate the interaction between the processing component 1802 and other components. For example, the processing component 1802 may include a multimedia module to facilitate the interaction between the multimedia component 1808 and the processing component 1802.

The memory 1804 may be configured to store various types of data to support the operation of the apparatus 1800. Examples of such data include instructions for any application or method operated on the apparatus 1800, contact data, phonebook data, messages, pictures, videos, and so on. The memory 1804 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic, or compact disk.

The power supply component 1806 may provide power to different components of the apparatus 1800. The power supply component 1806 may include a power management system, one or more power supplies and other components associated with generating, managing, and distributing power for the apparatus 1800.

The multimedia component 1808 may include a screen providing an output interface between the apparatus 1800 and a user. In some examples, the screen may include a Liquid Crystal Display (LCD) and a Touch Panel (TP). If the screen includes the TP, the screen may be implemented as a touch screen to receive input signals from the user. The TP may include one or more touch sensors to sense touches, swipes, and gestures on the TP. The touch sensors may not only sense a boundary of a touch or swipe, but also sense a duration and a pressure associated with the touch or swipe. In some examples, the multimedia component 1808 may include a front camera and/or a rear camera. The front camera and/or rear camera may receive external multimedia data when the apparatus 1800 is in an operating mode, such as a photographing mode or a video mode. Each of the front camera and the rear camera may be a fixed optical lens system or have focal length and optical zooming capability.

The audio component 1810 may be configured to output and/or input an audio signal. For example, the audio component 1810 may include a microphone (MIC) configured to receive an external audio signal when the apparatus 1800 is in an operating mode, such as a call mode, a recording mode, and a voice recognition mode. The received audio signal may be further stored in the memory 1804 or sent via the communication component 1816. In some examples, the audio component 1810 further includes a speaker to output an audio signal.

The I/O interface 1812 provides an interface between the processing component 1802 and peripheral interface modules. The above peripheral interface modules may be a keyboard, a click wheel, buttons, and so on. These buttons may include, but are not limited to, a home button, a volume button, a starting button, and a locking button.

The sensor component 1814 may include one or more sensors to provide status assessments of various aspects for the apparatus 1800. For example, the sensor component 1814 may detect an on/off state of the apparatus 1800, and relative positioning of component, for example, the component is a display and a mini-keypad of the apparatus 1800. The sensor component 1814 may also detect a change in position of the apparatus 1800 or one component of the apparatus 1800, a presence or absence of the contact between a user and the apparatus 1800, an orientation or an acceleration/deceleration of the apparatus 1800, and a change in temperature of the apparatus 1800. The sensor component 1814 may include a proximity sensor configured to detect the presence of a nearby object without any physical contact. The sensor component 1814 may further include an optical sensor, such as a CMOS or CCD image sensor which is used in imaging applications. In some examples, the sensor component 1814 may further include an acceleration sensor, a gyroscope sensor, a magnetic sensor, a pressure sensor, or a temperature sensor.

The communication component 1816 may be configured to facilitate wired or wireless communication between the apparatus 1800 and other devices. The apparatus 1800 may access a wireless network that is based on a communication standard, such as Wi-Fi, 2G, 3G, or a combination thereof. In an example, the communication component 1816 receives broadcast signals or broadcast-associated information from an external broadcast management system via a broadcast channel. In an example, the communication component 1816 further includes a Near Field Communication (NFC) module to facilitate short-range communications. For example, the NFC module may be implemented based on a Radio Frequency Identification (RFID) technology, an Infrared Data Association (IrDA) technology, an Ultra Wideband (UWB) technology, a Bluetooth® (BT) technology and other technologies.

In an example, the apparatus 1800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components for performing the above method.

In an example, there is also provided a non-transitory machine-readable storage medium including instructions, such as a memory 1804 including instructions. The above instructions may be executed by the processor 1820 of the apparatus 1800 to perform the above method. For example, the non-transitory machine-readable storage medium may be a ROM, a RAM, a CD-ROM, a magnetic tape, a floppy disk, and an optical data storage device and so on.

Figure 19:
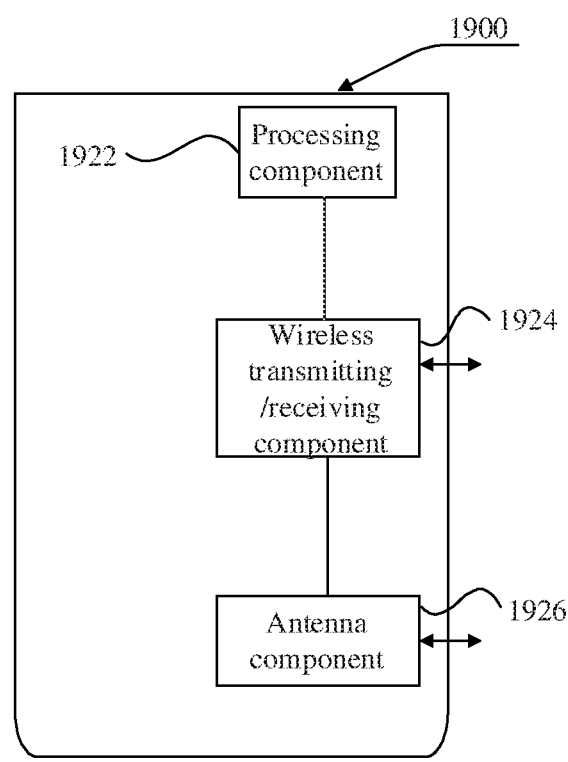
FIG. 19 is a structural diagram illustrating apparatus for obtaining uplink HARQ feedbacks according to an example of the present disclosure.

FIG. 19 is a structural diagram illustrating apparatus 1900 for obtaining uplink HARQ feedbacks according to an example of the present disclosure. The apparatus 1900 may be a base station. As shown in FIG. 19, the apparatus 1900 may include a processing component 1922, a wireless transmitting/receiving component 1924, an antenna component 1926 and a signal processing part unique to a wireless interface. The processing component 1922 may further include one or more processors.

One processor of the processing component 1922 may be configured to:

determine service priorities associated with a plurality of downlink subframes;

obtain a service priority ordered list by sorting the service priorities associated with the plurality of downlink subframes based on preset priority sorting information;

transmit the service priority ordered list to user equipment, so that the user equipment is enabled to bundle HARQ feedbacks associated with downlink subframes based on the service priority ordered list and assign uplink subframes for bundled HARQ feedbacks;

receive uplink HARQ feedbacks returned by the user equipment; and analyze the uplink HARQ feedbacks based on the service priority ordered list and a preset bundling number.

Other implementations of the present disclosure will be apparent to those skilled in the art from consideration of the specification and practice of the present disclosure herein. The present disclosure is intended to cover any variations, usages, or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

What is claimed is:

1. A method of transmitting uplink hybrid automatic repeat request (HARQ) feedbacks, the method being applied to user equipment and comprising:

obtaining a service priority ordered list associated with a plurality of downlink subframes;

generating to-be-sent HARQ feedbacks, by bundling HARQ feedbacks associated with downlink subframes in a descending order of service priorities based on the service priority ordered list; and successively assigning uplink subframes for the to-be-sent HARQ feedbacks to transmit the to-be-sent HARQ feedbacks to a base station;

wherein bundling the HARQ feedbacks associated with the downlink subframes in the descending order of the service priorities based on the service priority ordered list comprises:

dividing the service priority ordered list into a plurality of sub-lists, wherein each sub-list comprises subframe identifiers with a same priority; and based on the descending order of the service priorities and a preset bundling number, successively bundling the HARQ feedbacks associated with the subframe identifiers in each sub-list.

2. The method of claim 1, wherein obtaining the service priority ordered list associated with the plurality of the downlink subframes comprises:

receiving the service priority ordered list associated with the plurality of the downlink subframes within a preset time window from the base station, wherein the service priority ordered list comprises a plurality of subframe identifiers sorted based on a preset service priority order.

3. The method of claim 1, wherein obtaining the service priority ordered list associated with the plurality of the downlink subframes comprises:

obtaining a service type and a subframe identifier associated with each downlink subframe within a preset time window;

determining a service priority associated with each subframe identifier by querying a preset priority classification list based on the service type, wherein the preset priority classification list comprises a relationship between the service type and the service priority; and generating the service priority ordered list by sorting the subframe identifiers based on a preset service priority order.

4. The method of claim 3, wherein generating the service priority ordered list by sorting the plurality of the subframe identifiers based on the preset service priority order comprises:

when a number of the subframe identifiers with a same priority is greater than a preset bundling number, sorting the subframe identifiers with the same priority based on a receiving sequence of the downlink subframes.

5. An apparatus for transmitting uplink HARQ feedbacks, comprising:

a processor; and a memory for storing instructions executable by the processor;

wherein the processor is configured to:

obtain a service priority ordered list associated with a plurality of downlink subframes;

generate to-be-sent HARQ feedbacks, by bundling HARQ feedbacks associated with downlink subframes in a descending order of service priorities based on the service priority ordered list; and successively assign uplink subframes for the to-be-sent HARQ feedbacks to transmit the to-be-sent HARQ feedbacks to a base station;

wherein in bundling the HARQ feedbacks associated with the downlink subframes in the descending order of the service priorities based on the service priority ordered list, the processor is further configured to:

divide the service priority ordered list into a plurality of sub-lists, wherein each sub-list comprises subframe identifiers with a same priority; and based on the descending order of the service priorities and a preset bundling number, successively bundle the HARQ feedbacks associated with the subframe identifiers in each sub-list.

6. The apparatus of claim 5, wherein the processor is further configured to:

receive the service priority ordered list associated with the plurality of the downlink subframes within a preset time window from the base station, wherein the service priority ordered list includes a plurality of subframe identifiers sorted based on a preset service priority order.

7. The apparatus of claim 5, wherein the processor is further configured to:

obtain a service type and a subframe identifier associated with each downlink subframe within a preset time window;

determine a service priority associated with each subframe identifier by querying a preset priority classification list based on the service type, wherein the preset priority classification list includes a relationship between the service type and the service priority; and generate the service priority ordered list by sorting the subframe identifiers based on a preset service priority order.

8. The apparatus of claim 7, wherein the processor is further configured to:

sort the subframe identifiers with a same priority based on a receiving sequence of the downlink subframes in a case that a number of the subframe identifiers with the same priority is greater than a preset bundling number.

9. An apparatus for obtaining uplink HARQ feedbacks, comprising:

a processor; and a memory for storing instructions executable by the processor;

wherein the processor is configured to:

determine service priorities associated with a plurality of downlink subframes;

obtain a service priority ordered list by sorting the service priorities associated with the plurality of the downlink subframes based on preset priority sorting information;

transmit the service priority ordered list to user equipment, so that the user equipment is enabled to bundle HARQ feedbacks associated with downlink subframes based on the service priority ordered list and assign uplink subframes for to-be-sent HARQ feedbacks;

receive uplink HARQ feedbacks returned by the user equipment; and obtain feedbacks associated with the plurality of the downlink subframes by analyzing the uplink HARQ feedbacks based on the service priority ordered list and a preset bundling number; and determine which subframe to be re-transmitted based on a pre-agreed feedback multiplexing mode and the received HARQ feedbacks, wherein the pre-agreed feedback multiplexing mode comprises:

dividing the service priority ordered list into a plurality of sub-lists, wherein each sub-list comprises subframe identifiers with a same priority; and in a descending order of service priorities, successively multiplexing HARQ feedbacks associated with the subframe identifiers in each sub-list based on a preset multiplexing number.

10. The apparatus of claim 9, wherein the processor is further configured to:

record subframe identifiers and service types associated with the plurality of the downlink subframes; and determine the service priority associated with each subframe identifier by querying a preset priority classification list based on the service type associated with each downlink subframe, wherein the preset priority classification list includes a relationship between the service type and the service priority.

11. The apparatus of claim 10, wherein the processor is further configured to:

determine the preset priority classification list associated with user equipment based on equipment information of the user equipment.

12. The apparatus of claim 9, wherein the service priority ordered list comprises subframe identifiers associated with to-be-multiplexed feedbacks.

* * * * *